US008232870B2

(12) United States Patent
Yoshizawa

(10) Patent No.: US 8,232,870 B2
(45) Date of Patent: Jul. 31, 2012

(54) VEHICLE CONTROL APPARATUS AND VEHICLE HAVING THE SAME

(75) Inventor: Akihiro Yoshizawa, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 1157 days.

(21) Appl. No.: 11/831,682

(22) Filed: Jul. 31, 2007

(65) Prior Publication Data

US 2008/0030327 A1 Feb. 7, 2008

(30) Foreign Application Priority Data

Aug. 1, 2006 (JP) ................................. 2006-210007

(51) Int. Cl.
*B60R 25/10* (2006.01)
(52) U.S. Cl. .................... 340/426.15; 340/5.8; 340/435; 340/425.5; 340/426.17
(58) Field of Classification Search .................. 340/5.8
See application file for complete search history.

(56) References Cited

U.S. PATENT DOCUMENTS

| 5,670,953 A * | 9/1997 | Satoh et al. .................. 340/903 |
| 6,922,629 B2 * | 7/2005 | Yoshikawa et al. ........... 701/117 |
| 2005/0242929 A1 * | 11/2005 | Onishi et al. ............. 340/426.17 |
| 2005/0280499 A1 * | 12/2005 | Konno .......................... 340/5.3 |
| 2006/0022793 A1 * | 2/2006 | Konno et al. .................. 340/5.6 |
| 2006/0187007 A1 * | 8/2006 | Konno et al. ............. 340/426.15 |
| 2007/0018799 A1 * | 1/2007 | Funayose et al. ........ 340/426.11 |
| 2007/0069871 A1 * | 3/2007 | Kishimoto et al. ...... 340/426.28 |

FOREIGN PATENT DOCUMENTS

JP 2004-114860 4/2004

OTHER PUBLICATIONS

Search Report for corresponding European application No. 07253002.5-1264 lists the reference above Nov. 14, 2007.

* cited by examiner

*Primary Examiner* — Benjamin C Lee
*Assistant Examiner* — Curtis King
(74) *Attorney, Agent, or Firm* — Rabin & Berdo, P.C.

(57) ABSTRACT

A vehicle control apparatus that informs that a smart key has been dropped at a location as proximate to a location of the dropping the smart key as possible while minimizing consumption of a battery of the smart key. A transmitting/receiving circuit transmits to the smart key a code request signal for confirming whether the smart key is disposed within a predetermined range of a motorcycle by a predetermined transmission period, and receive a code signal transmitted from the smart key receiving the code request signal. A code checking portion checks a code of a code signal received by the transmitting/receiving circuit. A control portion changes a period of transmitting the code request signal in accordance with a situation of running the motorcycle to detect dropping of the smart key.

13 Claims, 13 Drawing Sheets

[Fig. 2]
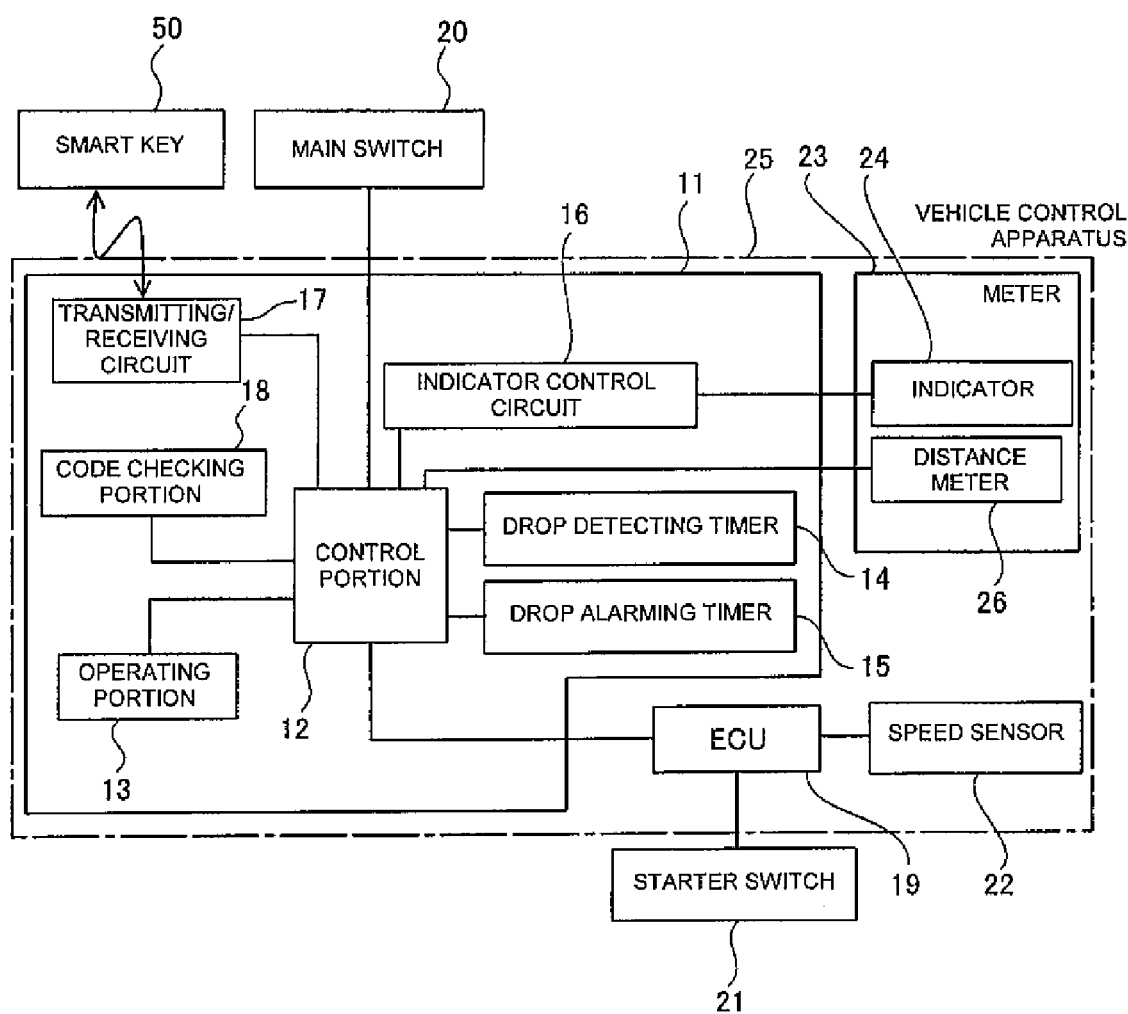

[Fig. 3]

| VEHICLE SPEED (km/h) | SUBTRACTING COUNTER LENGTH t1 OF DROP DETECTING TIMER (second) |
|---:|---:|
| 10 | 60 |
| 20 | 30 |
| 40 | 15 |
| 60 | 10 |
| 80 | 7.5 |
| 100 | 6 |
| 120 | 5 |
| 140 | 4.3 |

[Fig. 4]
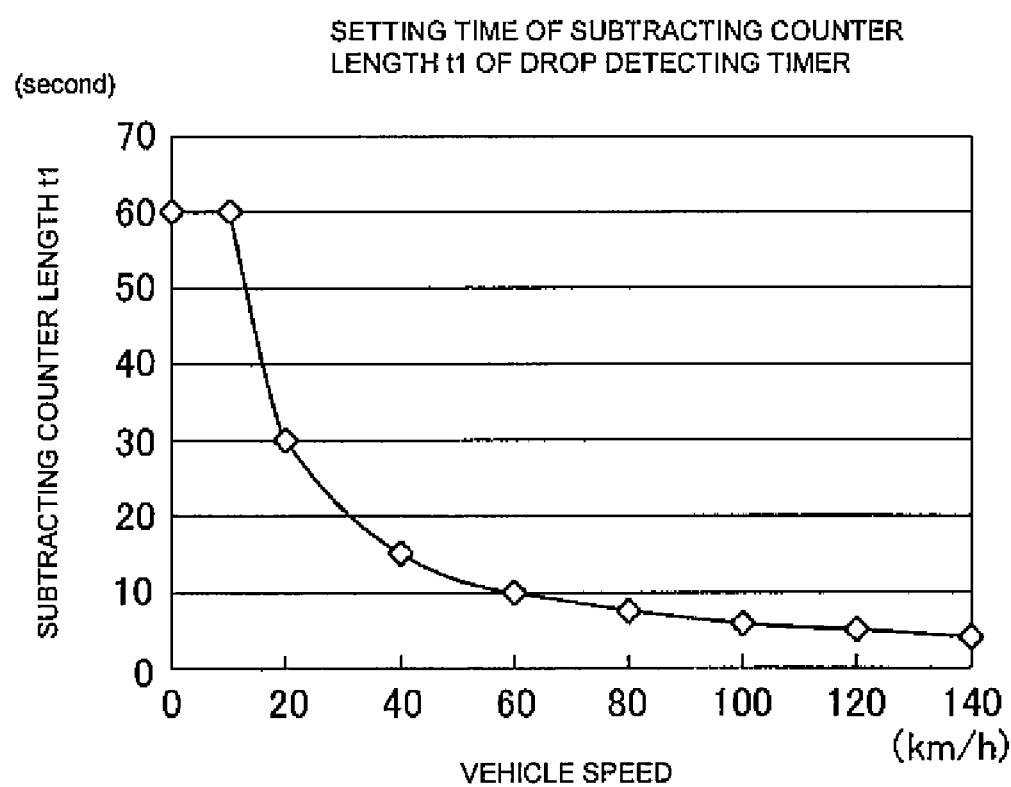

[Fig. 5]

| VEHICLE SPEED (km/h) | SUBTRACTING COUNTER LENGTH t2 OF DROP ALARMING TIMER (second) |
|---|---|
| 10 | 360 |
| 20 | 180 |
| 40 | 90 |
| 60 | 60 |
| 80 | 45 |
| 100 | 36 |
| 120 | 30 |
| 140 | 25.7 |

[Fig. 6]
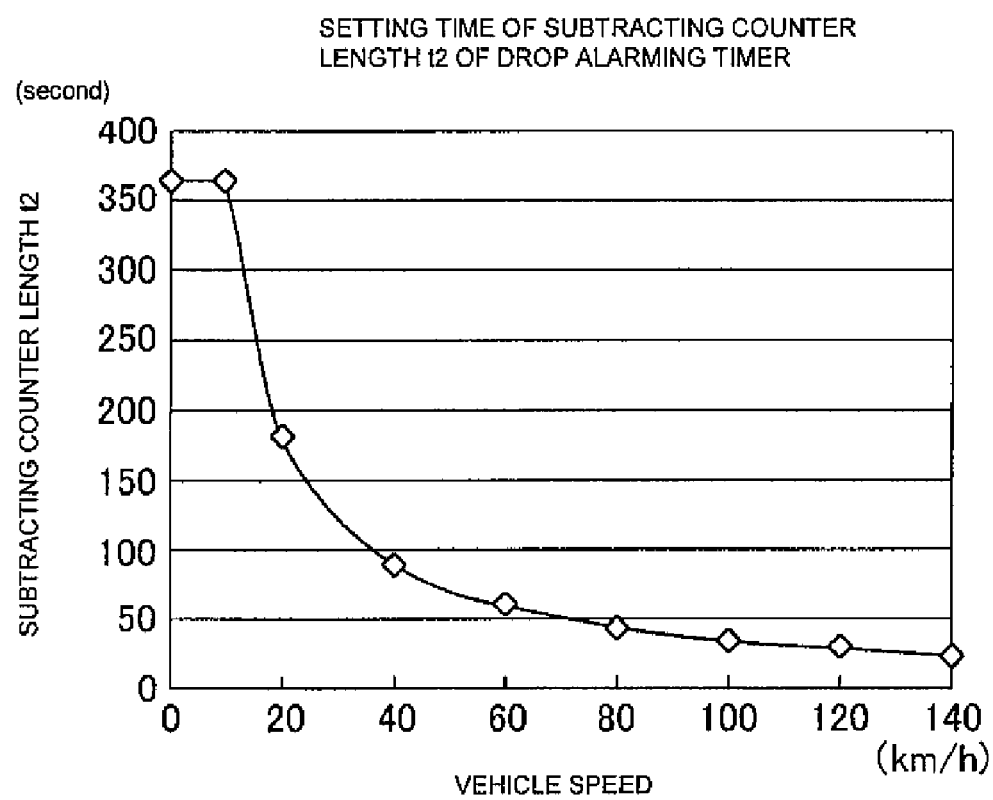

[Fig. 7]
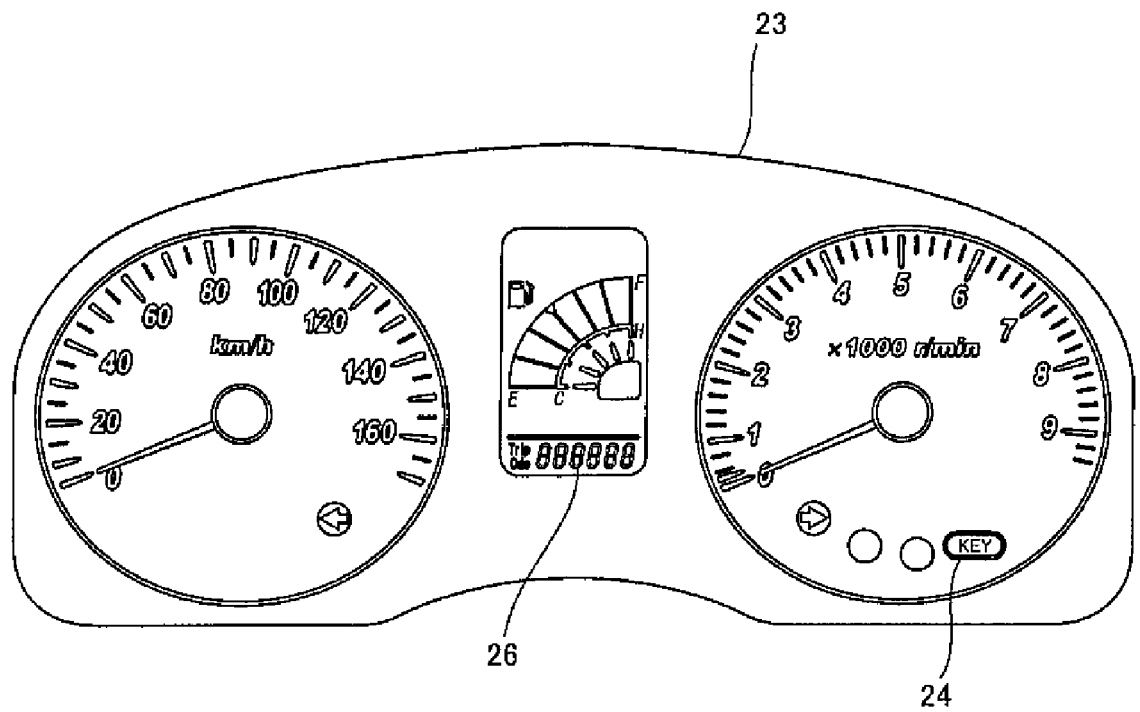

[Fig. 8]
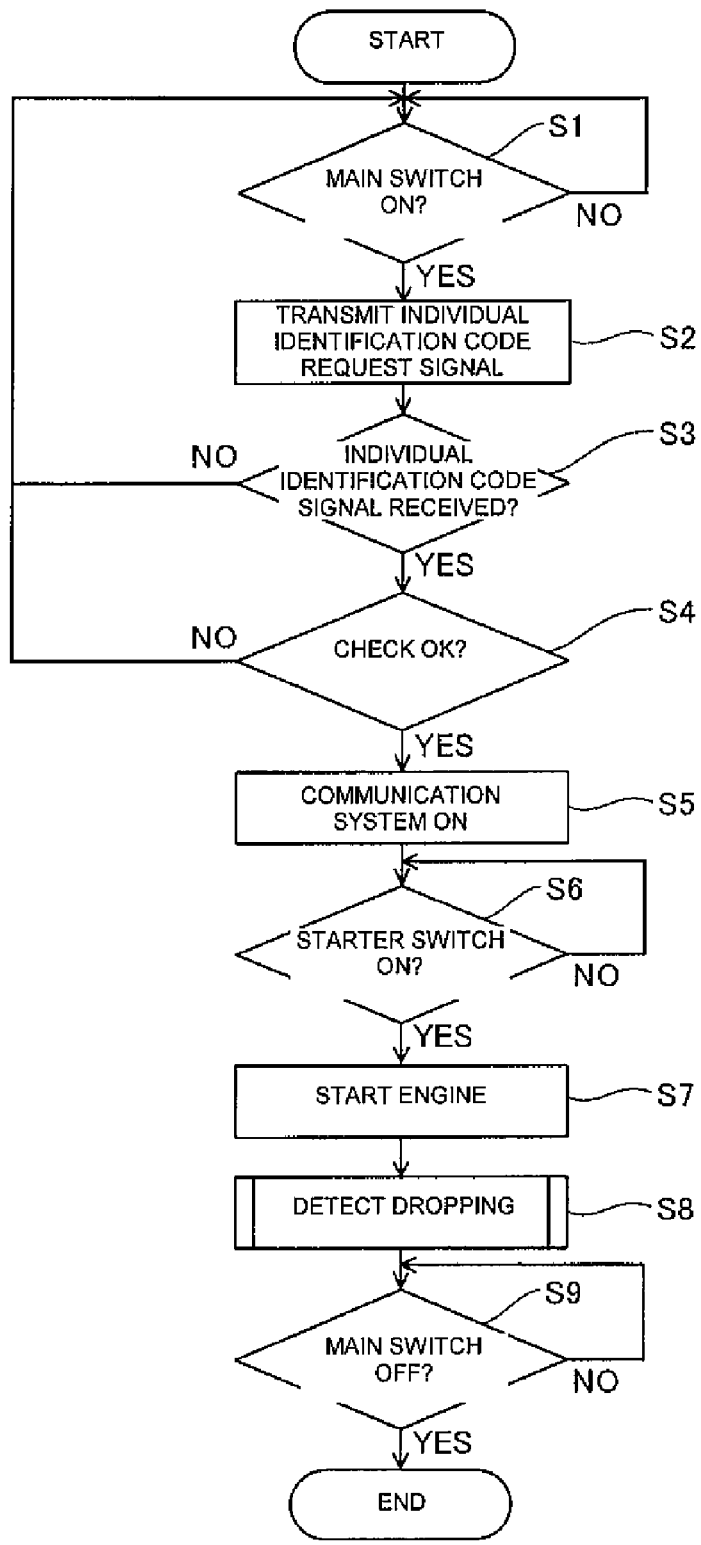

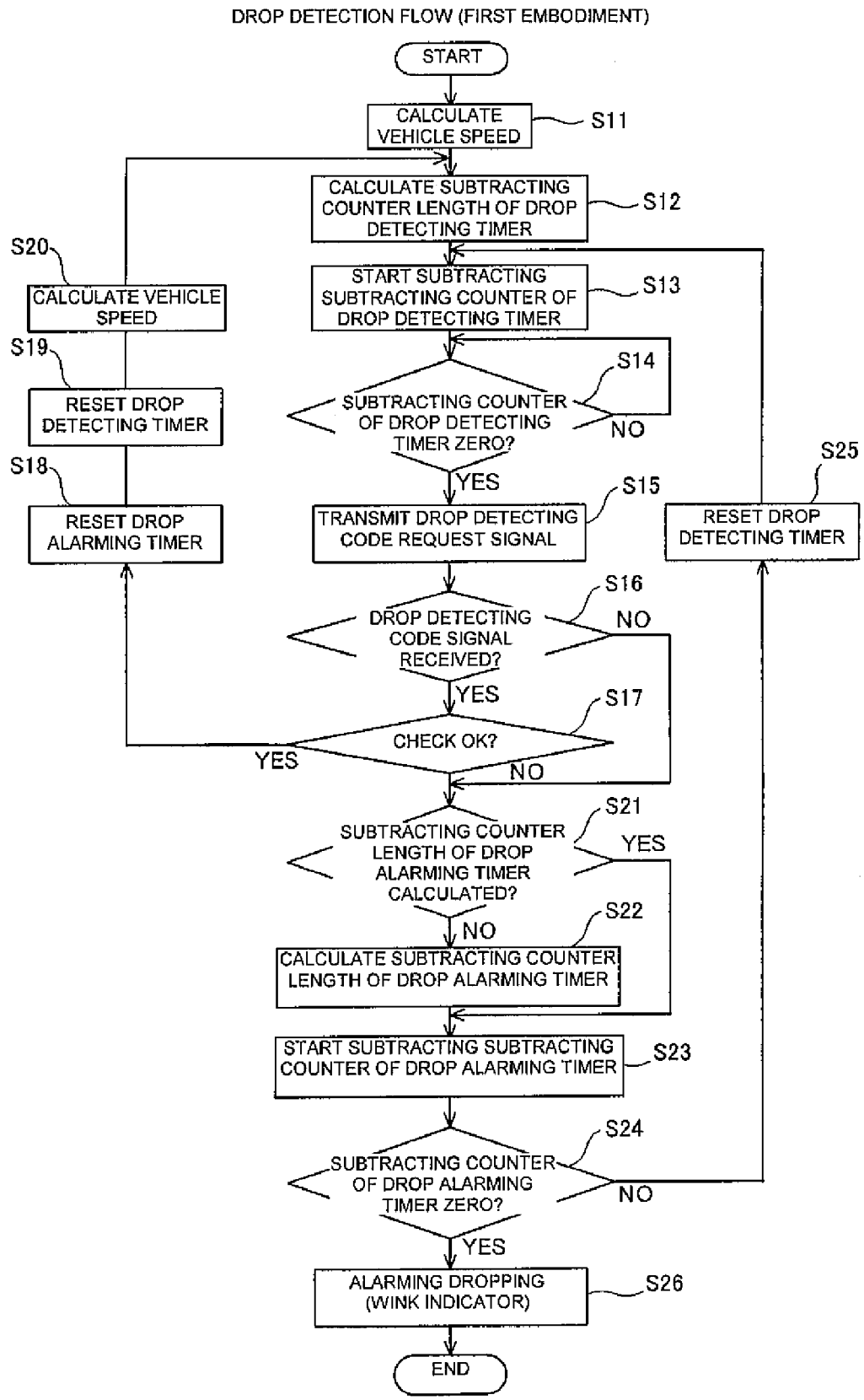
[Fig. 9]

[Fig. 10]
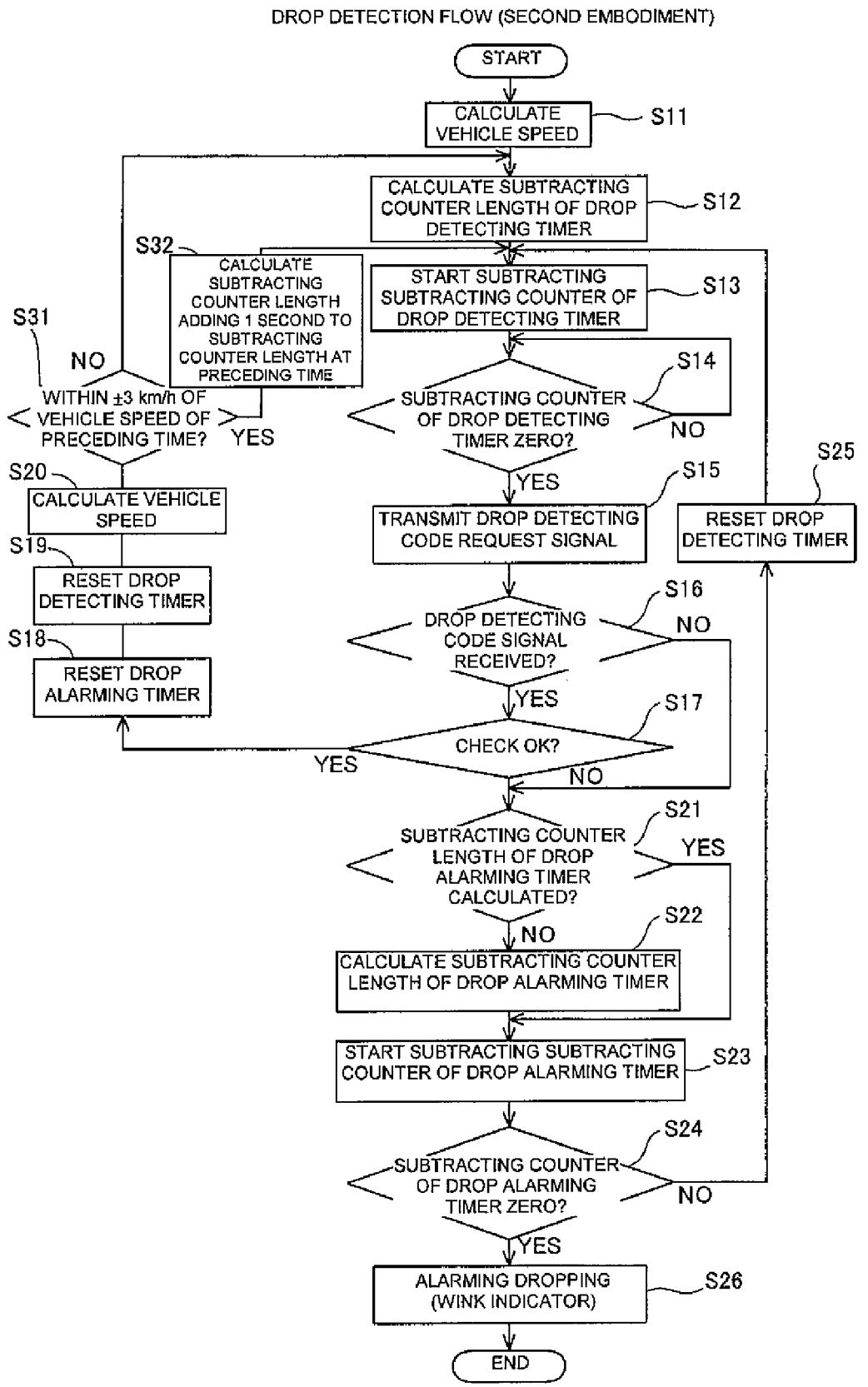

[Fig. 11]
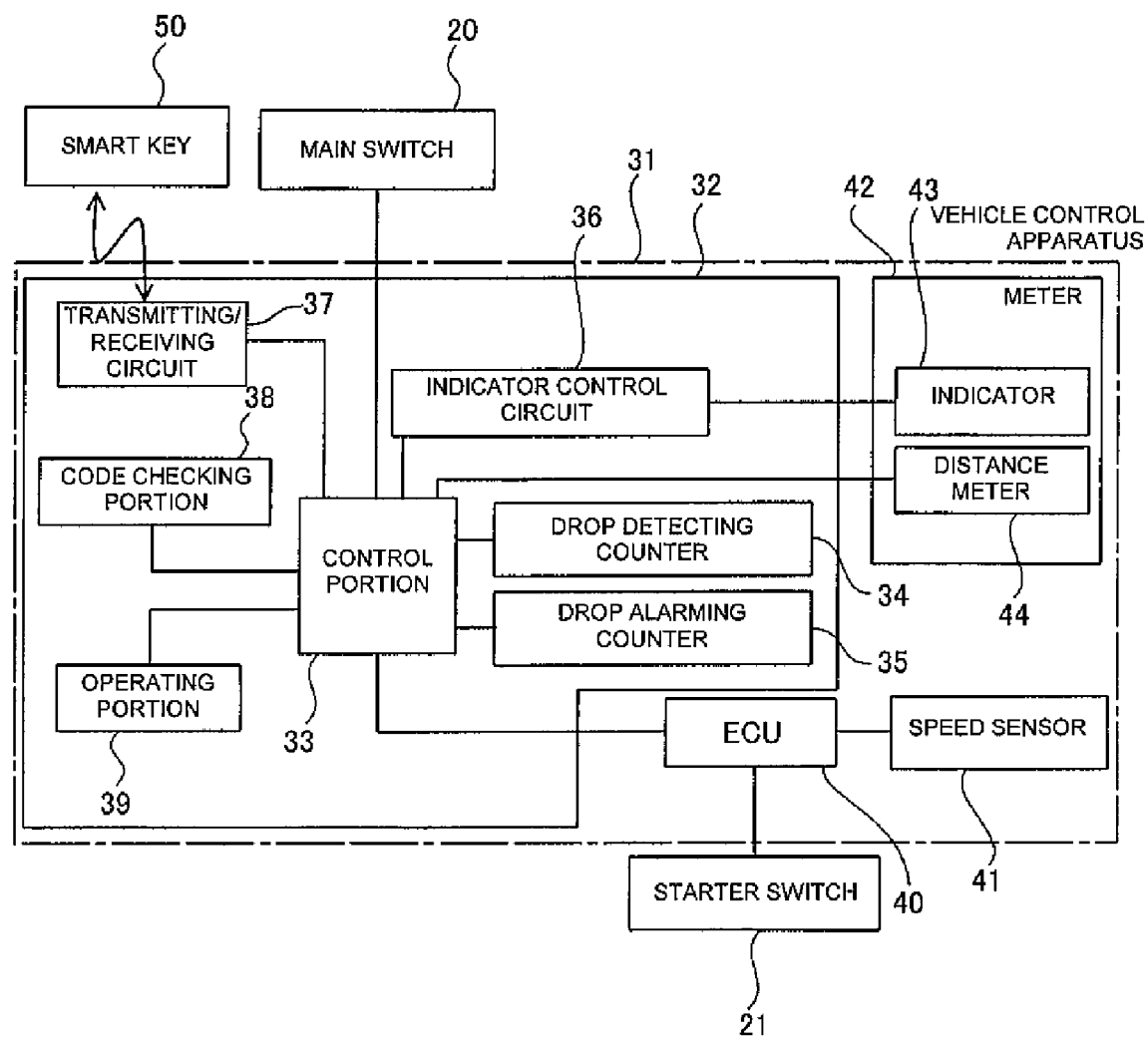

[Fig. 12]
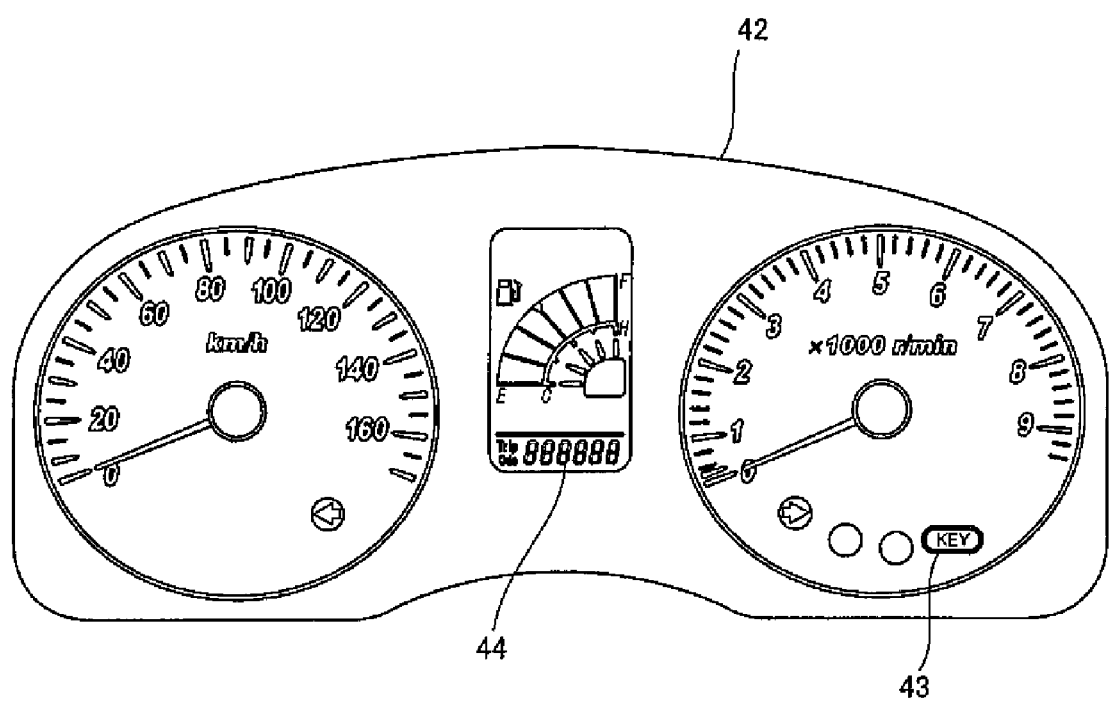

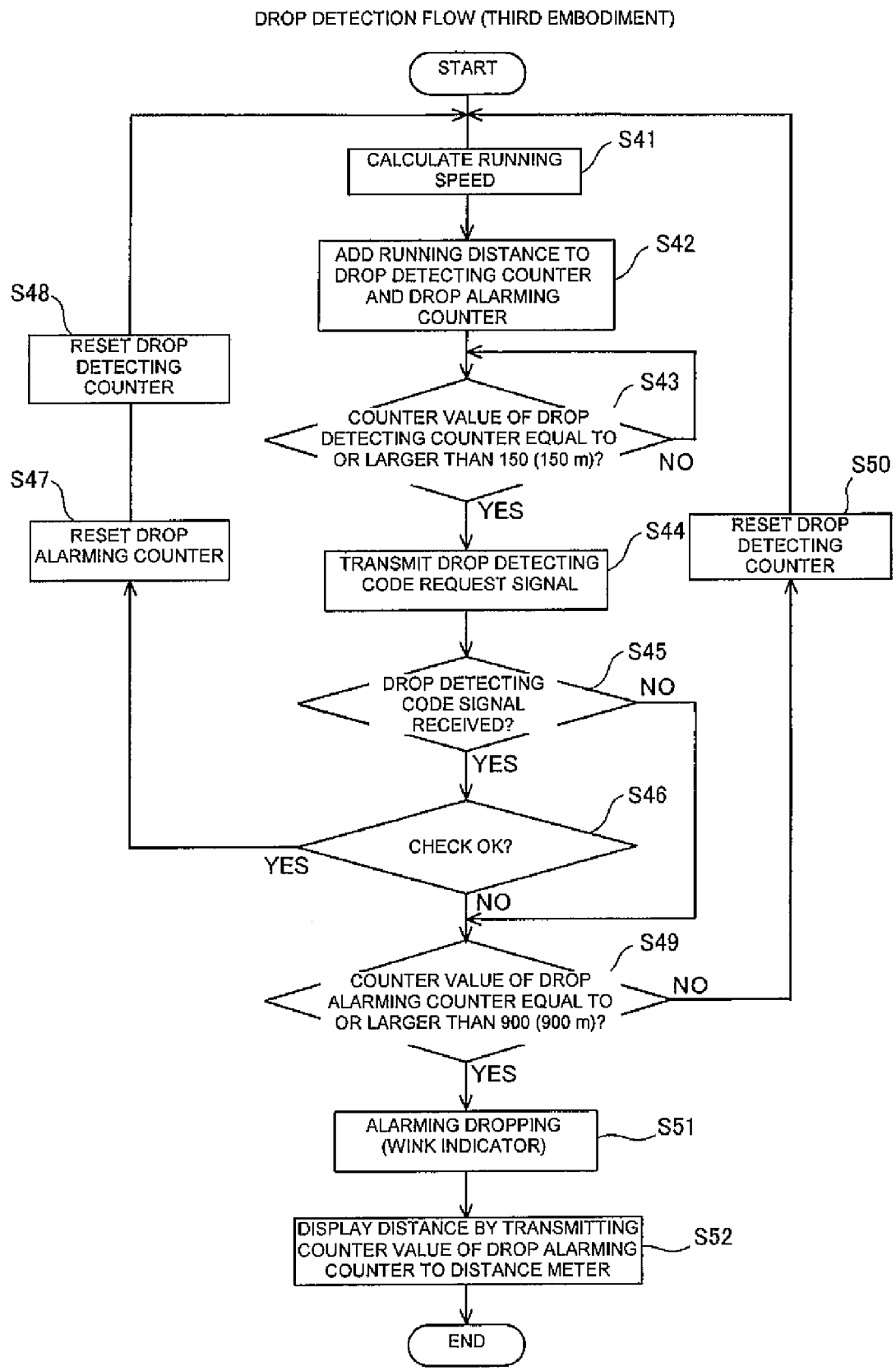

VEHICLE CONTROL APPARATUS AND VEHICLE HAVING THE SAME

RELATED APPLICATIONS

This application claims the benefit of priority under 35 USC 119 of Japanese patent application no. 2006-210007, filed on Aug. 1, 2006, which application is hereby incorporated by reference in its entirety.

BACKGROUND OF THE INVENTION

1. Field of the Invention

The present invention relates to a vehicle control apparatus for permitting use of a vehicle.

2. Description of Related Art

A vehicular electronic key system for permitting use of a vehicle is known in the art (see, for example, JP-A-2004-114860). JP-A-2004-114860 discloses a vehicular electronic key system including a control apparatus mounted to a vehicle and an electronic key (portable machine) for transmitting a response signal based on reception of a request signal from the control apparatus. The control apparatus is provided with request signal generating means for outputting the request signal at previously set constant time periods (10-100 seconds) to the electronic key when an engine is operated.

In JP-A-2004-114860, since the period of outputting the request signal to the electronic key is previously set to a constant time period (10-100 seconds), when the period of outputting the request signal is set to a relatively long period, for example to 100 seconds, there is a problem at high running speeds in that, when an alarm is output, the vehicle may have already moved a long distance from the location where the electronic key was dropped. On the other hand, when the period of outputting the request signal is set to a relatively short period, for example to 10 seconds, there is a problem in that when the vehicle is stopped, even though the user already knows that the electronic key is dropped, consumption of a battery of the electronic key is increased since the output of the request signal continues to be carried out at a comparatively short interval of 10 seconds.

SUMMARY OF THE INVENTION

The invention resolves these problems and provides a vehicle control apparatus that informs that a portable machine (electronic key) is dropped at a location as proximate as possible to the location that the portable machine was dropped while restraining battery consumption.

A vehicle control apparatus according to a first aspect of the invention comprises transmitting means for transmitting to a portable machine a code request signal for confirming whether the portable machine is disposed within a predetermined range by a predetermined transmission period in order to detect dropping of the portable machine. Receiving means receive a code signal transmitted from the portable machine receiving the code request signal. Code checking means check a code of the code signal received by the receiving means. A transmission control portion changes the period of transmitting the code request signal in accordance with a situation of running the vehicle.

According to the first aspect of the invention, by changing the period of transmitting the code request signal to the portable machine in accordance with the situation of running the vehicle, when the transmission period of the code request signal is reduced in accordance with an increase in the vehicle speed, it can be confirmed swiftly even at high speeds whether the portable machine is dropped. Therefore, the driver is informed that there is a possibility that the portable machine is dropped at a location as proximate to a location of dropping the portable machine as possible. When the vehicle runs at low speed, the transmission period of the code request signal is increased, and the number of times of outputting the code signal by the portable machine is reduced, thereby minimizing battery consumption.

In one embodiment, the period of transmitting the code request signal is changed in accordance with a speed of the vehicle. In this manner, the transmission period of the code request signal is changed in accordance with the situation of running the vehicle.

In one embodiment, the transmission control portion decreases the period of transmitting the code request signal as vehicle speed increases. In this manner, the driver is informed that the portable machine is dropped at a location as proximate to a location of dropping the portable machine as possible even at high speeds. And, when the vehicle runs at low speed or is stopped, battery consumption is restrained.

In one embodiment, the apparatus further comprises a first timer for measuring the period of transmitting the code request signal. In this manner, the period of transmitting the code request signal is easily measured by the first timer.

In one embodiment, the apparatus further comprises alarming means for notifying a driver that the portable machine is not disposed within the predetermined range when the code checking means cannot check the code of the code signal. Thus, the driver is easily informed that the portable machine is dropped.

In one embodiment, the alarming means notifies the driver that the portable machine is not disposed within the predetermined range when the receiving means cannot receive the code signal continuously by a plurality of times. Even in a case in which the receiving means cannot receive the code signal once because of noise from the vehicle and surrounding environment, when the code signal is received the next time, it is recognized that the portable machine is not dropped, and erroneous notifications are not carried out frequently to the driver.

In one embodiment, the apparatus further comprises a notification control portion for changing a notification time period until the alarming means notifies driver that the portable machine is not disposed within the predetermined range. By shortening a notification time period until the driver is informed that the portable machine is not disposed within the predetermined range in accordance with an increase in vehicle speed, the driver can swiftly confirm whether the portable machine is dropped. Therefore, even when the vehicle runs at high speed, the driver is informed of the fact that the portable machine is dropped at a location as proximate to a location of dropping the portable machine as possible.

In one embodiment, the notification control portion shortens the notification time period in accordance with an increase in the speed of the vehicle. When the speed of the vehicle is large, the notification time period until the driver is informed that the portable machine is not disposed within the predetermined range is shortened, and the driver is therefore informed that the portable machine is dropped at a location as proximate to a location of dropping the portable machine as possible.

In one embodiment, the apparatus further comprises a second timer for measuring a notification time period set in accordance with the speed of the vehicle. The notification control portion notifies by the alarming means when the notification time period by the second timer is finished. Thus, the notification time period set in accordance with the speed of the vehicle is easily measured by the second timer.

In one embodiment, the transmission control portion increases the period of transmitting the code request signal when the speed of the vehicle is substantially constant. When the vehicle speed is constant, driver motion is reduced, and therefore the possibility of dropping the portable machine is reduced. When the period of transmitting the code request signal is increased, the number of times of outputting the code signal is reduced, and battery consumption is therefore reduced.

A vehicle control apparatus according to a second aspect of the invention comprises transmitting means for transmitting to a portable machine for permitting use of a vehicle a code request signal for confirming whether the portable machine is disposed within a predetermined range of the vehicle by a predetermined transmission period. Receiving means receive a code signal transmitted from the portable machine receiving the code request signal. Code checking means check a code of the code signal received by the receiving means. Alarming means notify a driver that the portable machine is not disposed within the predetermined range of the vehicle when the code signal cannot be checked by the code checking means. A notification control portion makes the alarming means notify that the portable machine is not disposed within the predetermined range of the vehicle when a distance of moving the vehicle reaches a first distance by continuing a state in which the code signal cannot be checked by the code checking means.

According to the second aspect of the invention, by providing the alarming means with the notification control portion for notifying that the portable machine is not disposed within the predetermined range, when the state in which the code signal cannot be checked is continued and the first distance is reached, the driver is alarmed that the portable machine is dropped. Therefore, regardless of the speed of running the vehicle, the driver is informed that there is a possibility that the portable machine was dropped at a vicinity of a location remote from a location of dropping the portable machine by the first distance. Thereby, regardless of vehicle speed, the driver is informed that the portable machine is dropped at a spot at a constant (first) distance from the location of dropping the portable machine.

In one embodiment, the apparatus further comprises a display portion for displaying a distance from a spot at which the code signal is not checked by the code checking means first to a current spot of running the vehicle when the distance of moving the vehicle reaches the first distance and a notification by the alarming means is carried out. The driver can thereby easily know the distance from the location of dropping the portable machine by the display portion.

In one embodiment, the apparatus further comprises transmission controlling means for transmitting the code request signal at each second distance shorter than the first distance to the portable machine. In this manner, the code signal can be received by a plurality of times during a time period until the vehicle reaches the first distance, and therefore, erroneous notifications to the driver owing to noise from the vehicle and surrounding environment are avoided.

In one embodiment, the apparatus further comprises rotation detecting means for detecting rotation of a predetermined rotating portion when the vehicle is moved, wherein the distance of moving the vehicle is calculated based on a detection result of the rotation detecting means. The distance of moving the vehicle is thereby easily calculated.

A vehicle control apparatus according to a third aspect of the invention comprises transmitting means for transmitting to a portable machine for permitting use of a vehicle a code request signal for confirming whether the portable machine is disposed within a predetermined range of the vehicle by a predetermined transmission period in order to detect dropping of the portable machine. Receiving means receive a code signal transmitted from the portable machine receiving the code request signal. Code checking means check a code of the code signal received by the receiving means. Alarming means notify a driver that the portable machine is not disposed within the predetermined range of the vehicle when the code signal cannot be checked by the code checking means. A notification control portion changes a notification time period until the alarming means informs the driver that the portable machine is not disposed within the predetermined range of the vehicle.

According to the third aspect of the invention, by shortening the notification time period until the driver is informed of the fact that the portable machine is not disposed within the predetermined range of the vehicle in accordance with increased vehicle speed, the driver can swiftly confirm whether the portable machine is dropped. Therefore, even at high speeds, the driver is informed of the fact that the portable machine is dropped at a location as proximate to a location of dropping the portable machine as possible.

A vehicle according to a fourth aspect of the invention comprises the vehicle control apparatus described in any the above-described constitutions. By providing the vehicle control apparatus to the vehicle, the driver is informed that the portable machine is dropped at a location as proximate to a location of dropping the portable machine as possible while battery consumption is restrained.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 2 is a block diagram of a vehicle control apparatus according to the first embodiment of the invention.

FIG. 3 is a table showing calculation of a subtracting counter length of a drop detecting timer according to the first embodiment of the invention.

FIG. 4 is a graph depicting calculation of the subtracting counter length of the drop detecting timer according to the first embodiment of the invention.

FIG. 5 is a table showing calculation of a subtracting counter length of a drop alarming timer according to the first embodiment of the invention.

FIG. 6 is a graph depicting calculation of the subtracting counter length of the drop alarming timer according to the first embodiment of the invention.

FIG. 7 is a front view of a meter according to the first embodiment of the invention.

FIG. 8 is a flowchart of a processing flow of the vehicle control apparatus according to the first embodiment of the invention.

FIG. 9 is a flowchart of a processing flow of dropping detection of the vehicle control apparatus according to the first embodiment of the invention.

FIG. 10 is a flowchart of a processing flow of dropping detection of a vehicle control apparatus according to a second embodiment of the invention.

FIG. 11 is a block diagram of a vehicle control apparatus according to a third embodiment of the invention.

FIG. 12 is a front view of a meter according to the third embodiment of the invention.

FIG. 13 is a flowchart of a processing flow of dropping detection of the vehicle control apparatus according to the third embodiment of the invention.

DETAILED DESCRIPTION OF THE INVENTION

Figure 1:
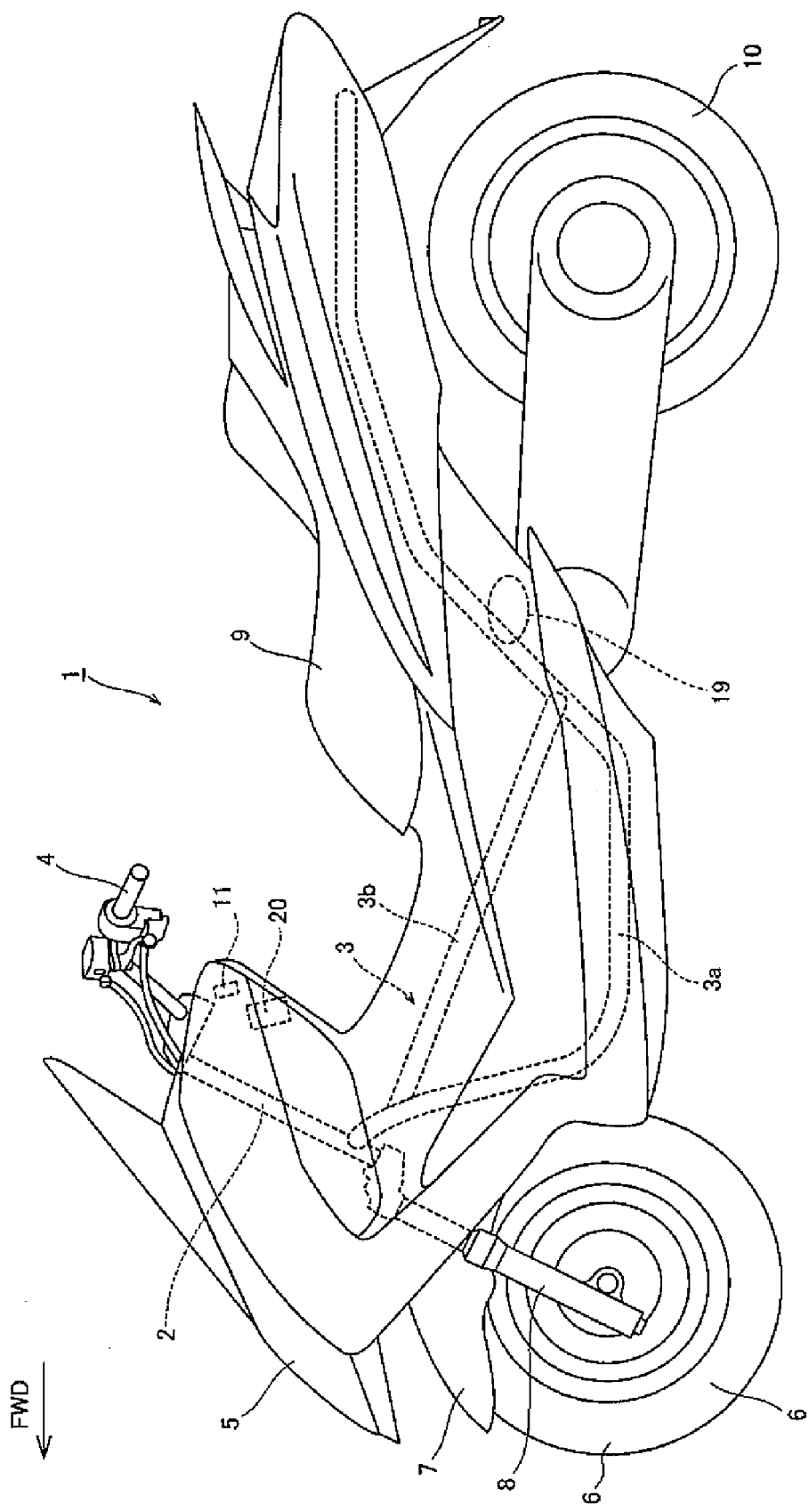
FIG. 1 is a side view of a motorcycle according to a first embodiment of the invention.

Embodiments of the invention are now explained with reference to the drawings.

(First Embodiment)

FIG. 1 is a side view of a motorcycle 1 according to, a first embodiment of the invention. FIGS. 2-7 explain a vehicle control apparatus of motorcycle 1. The arrow mark FWD in the drawings indicates a front side in a running direction of motorcycle 1.

Motorcycle 1 comprises a main frame 3 arranged on a rear side of a head pipe 2. Main frame 3 includes a frame main body portion 3a and a support portion 3b supporting two points of an upper portion of frame main body portion 3a. Head pipe 2 and main frame 3 constitute a vehicle body frame.

A handle 4 attached with a throttle, not illustrated, is arranged on an upper side of head pipe 2. A front cowl 5 covers a front side of head pipe 2. A lower side of front cowl 5 is arranged with a front wheel 6. A front fender 7 is arranged on an upper side of front wheel 6. Front wheel 6 is rotatably attached to lower portions of a pair of front forks 8.

A seat 9 is arranged at an upper portion of a rear side of main frame 3. A rear wheel 10 is rotatably arranged on a lower side of a rear end portion of main frame 3.

A control unit 11 is provided on a rear side of head pipe 2. As shown in FIG. 2, control unit 11 comprises a control portion 12. An operating portion 13, a drop detecting timer 14, a drop alarming timer 15, an indicator control circuit 16, a transmitting/receiving circuit 17 and a code checking portion 18 are connected to control portion 12. Control portion 12 is an example of a 'transmission control portion' and a 'notification control portion' of the invention. Drop detecting timer 14 is an example of a 'first timer' of the invention. Drop alarming timer 15 is an example of a 'second timer' of the invention. Transmitting/receiving circuit 17 is an example of a 'transmitting means' and a 'receiving means' of the invention. Code checking portion 18 is an example of a 'code checking means' of the invention.

Control portion 12 is connected to ECU (engine control unit) 19 arranged on a lower side of seat 9 (FIG. 1), and a main switch 20 (FIG. 2) arranged on a lower side of a center portion in a width direction of handle 4 (FIG. 1). Control portion 12 and ECU 19 carry out serial communication by using a SCI (serial communication interface). ECU 19 is connected to a starter switch 21 attached to handle 4, and to a speed sensor 22 arranged at a vicinity of rear wheel 10 for detecting a number of revolutions of rear wheel 10. Speed sensor 22 is an example of a 'rotation detecting means' of the invention. ECU 19 transmits the number of revolutions of rear wheel 10 detected by speed sensor 22 to control portion 12.

When main switch 20 is ON, control portion 12 carries out communication with transmitting/receiving circuit 17 and a smart key 50 for permitting use of motorcycle 1, and starts control unit 11 when it is determined that smart key 50 is a smart key in correspondence with motorcycle 1. Thereby, when it is determined that smart key 50 is the smart key in correspondence with motorcycle 1, a communication system between control unit 11 and smart key 50 for detecting drop of smart key 50, mentioned later, and smart key 50 are brought into an ON state. Smart key 50 is an example of a 'portable machine' of the invention.

Operating portion 13 calculates vehicle speed based on the number of revolutions of rear wheel 10 detected by speed sensor 22 and transmitted from control portion 12 (ECU 19). As shown in FIGS. 3 and 4, when motorcycle 1 runs at a speed equal to or faster than 10 km/h, operating portion 13 calculates a subtracting counter length (transmission period) t1 of drop detecting timer 14 from the equation t1=600/vehicle speed. As shown in FIGS. 5 and 6, operating portion 13 calculates a subtracting counter length t2 of drop alarming timer 15 from the equation t2=3600/vehicle speed, similar to calculation of subtracting counter length t1 of drop detecting timer 14. As shown in FIGS. 4 and 6, when the speed of motorcycle 1 is equal to or lower than 10 km/h, subtracting counter length t1 (FIG. 4) of drop detecting timer 14 is fixed to 60 seconds and subtracting counter length t2 (FIG. 6) of drop alarming timer 15 is fixed to 360 seconds. When drop detecting timer 14 is made ON by control portion 12, the subtracting counter becomes 0 after t1 seconds. When drop alarming timer 15 is made ON by control portion 12, the subtracting counter becomes 0 after t2 seconds.

Indicator control circuit 16 is connected to an indicator 24 provided at a meter 23 arranged on the rear side of front cowl 5 (FIG. 1). A vehicle control apparatus 25 comprises meter 23, speed sensor 22, ECU 19 and control unit 11. Meter 23 has a distance meter 26 comprising a liquid crystal display portion. Distance meter 26 displays a running distance of motorcycle 1 calculated by operating portion 13 based on the number of revolutions of rear wheel 10 acquired by speed sensor 22. Control portion 12 and distance meter 26 carry out serial communication by using SCI. Indicator control circuit 16 is provided with a function of winking or turning off indicator 24 by a signal from control portion 12. Indicator 24 is an example of an 'alarming means' of the invention.

Transmitting/receiving circuit 17 communicates with smart key 50 Smart key 50 includes a battery and is recorded with an individual identification code for determining whether smart key 50 corresponds to motorcycle 1, and a drop detecting code for confirming whether smart key 50 is disposed within a predetermined range (about 1 m) from motorcycle 1 in order to determine whether a driver has dropped smart key 50. The individual identification code is complicated and long to deter robbery, whereas the drop detecting code is simple and short to determine only whether smart key 50 is disposed within a predetermined range from motorcycle 1. That is, the individual identification code signal transmitted from smart key 50 to transmitting/receiving circuit 17 is complicated and long, and the drop detecting code signal is simple and short.

Transmitting/receiving circuit 17 transmits an individual identification code request signal for requesting smart key 50 to transmit the individual identification code, and transmits a drop detecting code request signal for requesting smart key 50 to transmit the drop detecting code. The individual identification code request signal and the drop detecting code request signal are simple and short signals.

Transmitting/receiving circuit 17 transmits the individual identification code request signal to smart key 50 by control portion 12 when main switch 20 and starter switch 21 are depressed. Transmitting/receiving circuit 17 transmits the drop detecting code request signal to smart key 50 when the subtracting counter of drop detecting. timer 14 becomes 0 in a state that the communication system between control unit 11 and smart key 50 for detecting drop of smart key 50 is made ON by control portion 12. Transmitting/receiving circuit 17 transmits the signal received from smart key 50 to control portion 12.

Code checking portion 18 acquires the signal received from smart key 50 and transmitted to control portion 12 by transmitting/receiving circuit 17. Code checking portion 18 is recorded with individual identification and drop detecting codes identical to the codes recorded to smart key 50. When the individual identification code or the drop detecting code is transmitted from control portion 12 (smart key 50), code checking portion 18 determines whether the transmitted individual identification code or the transmitted drop detecting code matches the individual identification code or the drop detecting code recorded to code checking portion 18.

FIG. 8 is a flowchart of a processing flow of vehicle control apparatus 25 according to the first embodiment of the invention. A detailed explanation of the processing flow of vehicle control apparatus 25 is given with reference to FIGS. 2 and 8.

At step S1, it is determined whether main switch 20 is ON. When main switch 20 is not ON, step S1 is repeated. When main switch 20 is ON, this fact is transmitted to control portion 12 and the operation proceeds to step S2. At step S2, the individual identification code request signal is transmitted from transmitting/receiving circuit 17 to smart key 50. When smart key 50 is disposed within a communication range (about 1 m) of control unit 11 (transmitting/receiving circuit 17), the individual identification code request signal is received by smart key 50, and smart key 50 transmits the individual identification code signal to transmitting/receiving circuit 17.

At step S3, it is determined whether the individual identification code signal is received by transmitting/receiving circuit 17. When the individual identification code signal is not received, the operation returns to step S1. When the individual identification code signal is received, the operation proceeds to step S4.

At step S4, the received individual identification code signal is transmitted to code checking portion 18 by way of control portion 12, and code checking portion 18 determines whether the individual identification code in the signal received from smart key 50 matches the individual identification code previously recorded in code checking portion 18. When the codes do not match, the operation returns to step S1. When the codes match, the operation proceeds to step S5. At step S5, the communication system between control unit 11 and smart key 50 for checking dropping of smart key 50 is brought into an ON state.

At step S6, it is determined whether starter switch 21 is ON. When starter switch 21 is not ON, step S6 is repeated. When starter switch 21 is ON, the operation proceeds to step S7 and the engine is started.

At step S8, dropping of smart key 50 is detected. At step S9, it is determined whether main switch 20 is OFF. When main switch 20 is not OFF, step S9 is repeated. When main switch 20 is OFF, the processing is finished.

FIG. 9 is a flowchart of the dropping detection step S8 of FIG. 8. A detailed explanation of the dropping detection processing of vehicle control apparatus 25 is given with reference to FIGS. 1-6, 8 and 9.

At step S11, the number of revolutions of rear wheel 10 detected by speed sensor 22 is transmitted from control portion 12 to operating portion 13 through ECU 19, and operating portion 13 calculates the vehicle speed. At step S12, based on the vehicle speed calculated at step S11, operating portion 13 calculates subtracting counter length t1 of drop detecting timer 14. As shown in FIGS. 3 and 4, subtracting counter length t1 of drop detecting timer 14 is calculated from the equation t1=600/vehicle speed when motorcycle 1 runs at a speed equal to or faster than 10 km/h, and is fixed to 60 seconds when the running speed of motorcycle 1 is equal to or slower than 10 km/h.

At step S13, drop detecting timer 14 is made ON and subtraction of the subtracting counter is started. The operation then proceeds to step S14.

At step S14, it is determined whether the subtracting counter of drop detecting timer 14 is 0. When the subtracting counter of drop detecting timer 14 is not 0, the determination is repeated until the subtracting counter becomes 0. When the subtracting counter of drop detecting timer 14 is 0, the operation proceeds to step S15.

At step S15, the drop detecting code request signal is transmitted from transmitting/receiving circuit 17 to smart key 50. When smart key 50 is disposed within the communication range (about 1 m) of control unit 11 (transmitting/receiving circuit 17), smart key 50 receives the drop detecting code request signal and transmits the drop detecting code signal to transmitting/receiving circuit 17.

At step S16, it is determined whether the drop detecting code signal is received by transmitting/receiving circuit 17 within a constant period of time. When the drop detecting code signal is received, the operation proceeds to step S17. At step S17, the received drop detecting code signal is transmitted to code checking portion 18 by way of control portion 12, and code checking portion 18 determines whether the drop detecting code in the signal received from smart key 50 matches the drop detecting code previously recorded in code checking portion 18. When the drop detecting codes match, the operation proceeds to step S18. At step S18, drop alarming timer 15 is reset, at step S19, drop detecting timer 14 is reset, and the operation proceeds to step S20. At step S20, the vehicle speed is calculated by operating portion 13 by a procedure similar to that of step S11, and the operation returns to step S12. At step S17, when the drop detecting codes do not match, the operation proceeds to step S21. At step S16, when the drop detecting code signal is not received in the constant period of time, the operation proceeds to step S21.

At step S21, it is determined whether subtracting counter length t2 (FIGS. 5 and 6) of drop alarming timer 15 is calculated based on the vehicle speed calculated at step S11 or step S20. When subtracting counter length t2 of drop alarming timer 15 is not calculated, the operation proceeds to step S22. At step S22, based on the speed of the vehicle calculated by either step S11 or S20, subtracting counter length t2 of drop alarming timer 15 is calculated by operating portion 13. As shown in FIGS. 5 and 6, subtracting counter length t2 of drop alarming timer 15 is calculated by the equation t2=3600/vehicle speed when motorcycle 1 runs at a speed equal to or faster than 10 km/h, and is fixed to 360 seconds when the running speed of motorcycle 1 is equal to or slower than 10 km/h. Thereafter, the operation proceeds to step S23. At step S21, when subtracting counter length t2 of drop alarming timer 15 has been calculated, the operation proceeds to step S23.

At step S23, drop alarming timer 15 is made ON and subtraction of the subtracting counter is started. The operation then proceeds to step S24.

At step S24, it is determined whether the subtracting counter of drop alarming timer 15 is 0. When the subtracting counter of drop alarming timer 15 is not 0, the operation proceeds to step S25, drop detecting timer 14 is reset, and the operation returns to step S13. When the subtracting counter of drop alarming timer 15 is 0, the operation proceeds to step S26.

At step S26, indicator 24 on meter 23 is winked by indicator control circuit 16 to signal that there is a high possibility of dropping smart key 50.

Thereafter, as described above, step S9 of FIG. 8 is repeated until main switch 20 is OFF. When main switch 20 is OFF, the processing is finished.

According to the first embodiment, by changing subtracting counter length t1 of the drop detecting code request signal of drop detecting timer 14 in accordance with the vehicle speed of motorcycle 1, when subtracting counter length t1 of the drop detecting code request signal is reduced in accordance with increased vehicle speed, it can be confirmed swiftly whether smart key 50 is dropped, and the driver is therefore informed that smart key 50 was dropped at a location as proximate to a location of dropping smart key 50 as possible. Further, when motorcycle 1 runs at low speed, subtracting counter length t1 of the drop detecting code request signal is increased, and therefore, the number of times of outputting the drop detecting code signal by smart key 50 is reduced, and consumption of the battery of smart key 50 is consequently restrained.

Further, according to the first embodiment, by changing subtracting counter length t1 of the drop detecting code request signal by in accordance with the speed of motorcycle 1, a period of transmitting the drop detecting code request signal by transmitting/receiving circuit 17 is easily changed in accordance with the situation of running motorcycle 1.

Further, according to the first embodiment, since subtracting counter length t1 of the drop detecting code request signal decreases as motorcycle speed increases, the driver is informed that smart key 50 is dropped at a location as proximate to a location of dropping smart key 50 as possible. And, when the vehicle runs at low speed or is stopped, battery consumption is effectively restrained.

Further, according to the first embodiment, by providing indicator 24 for notifying the driver that smart key 50 is not disposed within a radius of 1 m of motorcycle 1 when code checking portion 18 cannot check the code of the drop detecting code signal, the driver can be informed that smart key 50 is dropped.

Further, according to the first embodiment, by indicating that the drop detecting code signal is not received at indicator 24 continuously by a plurality of times until subtracting counter length t2 of drop alarming timer 15 becomes 0, even when transmitting/receiving circuit 17 cannot receive the drop detecting code signal owing to noise from motorcycle 1 and the surrounding environment, when the drop detecting code signal is received at next time of reception, it can be recognized that smart key 50 is not dropped, and therefore, erroneous notifications are not frequently made to the driver.

Further, according to the first embodiment, by changing subtracting counter length t2 of drop alarming timer 15 in accordance with the situation of running motorcycle 1, for example, by shortening a notifying time period until informing the driver that smart key 50 is not disposed within the radius of 1 m of motorcycle 1 in accordance with, for example, an increase in vehicle speed, the driver can swiftly confirm whether smart key 50 is dropped. Therefore, even when motorcycle 1 runs at high speed, the driver is informed that smart key 50 is dropped at a location as proximate to a location of dropping smart key 50 as possible.

(Second Embodiment)

FIG. 10 is a flowchart of a processing flow of dropping detection of a vehicle control apparatus according to a second embodiment of the invention. According to the second embodiment, when the vehicle speed continues substantially at a constant state, the subtracting counter length of drop detecting timer 14 is made to be longer than the subtracting counter length calculated at a preceding time by 1 second. Otherwise, the second embodiment is similar to the first embodiment.

The processing flow of the second embodiment other than drop detection is similar to that of steps S1-S9 (FIG. 8) of the first embodiment. A repeat explanation of these steps is therefore omitted. Further, steps S11-S26 of FIG. 10 are the same as those of the first embodiment in FIG. 9, and a repeat explanation is therefore omitted.

Drop detection processing according to the second embodiment of the invention is now described in detail with reference to FIGS. 2, 9 and 10.

According to the second embodiment, at succeeding step S31 after carrying out steps S11-S20 of FIG. 10, control portion 12 determines whether the vehicle speed calculated at step S20 is within a range of ±3 km/h of the vehicle speed calculated at step S11 or step S20 at preceding time. When the vehicle speed calculated at step S20 is not within ±3 km/h of the vehicle speed calculated at step S11 or step S20 at the preceding time, the operation returns to step S12. When the vehicle speed calculated at step S20 is within ±3 km/h of the vehicle speed calculated at step S11 or step S20 at the preceding time, the operation proceeds to step S32.

At step S32, operating portion 13 calculates a subtracting counter length (t1 +1) of drop detecting timer 14 by adding 1 second to the subtracting counter length t1 calculated at the preceding time. The operation then returns to step S13.

According to the second embodiment, when the speed of motorcycle 1 is within ±3 km/h of the speed of motorcycle 1 calculated at the preceding time, the subtracting counter length of the drop detecting code request signal is made larger than the subtracting counter length t1 calculated at the preceding time by 1 second. In this case, when the speed of motorcycle 1 is substantially constant, a motion of considerably moving the driver is reduced, and therefore, a possibility of dropping smart key 50 owned by the driver is reduced. By controlling increasing subtracting counter length t1 of the drop detecting code request signal, the number of times of outputting the drop detecting code signal by smart key 50 is reduced, and battery consumption is restrained.

(Third Embodiment)

FIGS. 11 and 12 depict a vehicle control apparatus according to a third embodiment of the invention. FIG. 13 is shows a processing flow of the third embodiment. According to the third embodiment, dropping is not detected and dropping is not alarmed by a period (time interval) changed in accordance with the vehicle speed but instead is detected at each predetermined distance and dropping is alarmed when a constant distance longer than the distance of detecting the dropping is reached.

As shown by FIG. 11, a control unit 32 included in a vehicle control apparatus 31 according to the third embodiment is provided with a control portion 33. A drop detecting counter 34, a drop alarming counter 35, an indicator control circuit 36, a transmitting/receiving circuit 37, a code checking portion 38 and an operating portion 39 are connected to control portion 33. Control portion 33 is an example of a 'transmission control portion' and a 'notification control portion' of the invention. Transmitting/receiving circuit 37 is an example of a 'transmitting means' and a 'receiving means' of the invention. Code checking portion 38 is an example of a 'code checking means' of the invention.

Control portion 33 is connected to ECU (engine control unit) 40 and main switch 20. Control portion 33 and ECU 40 carry out serial communication by using SCI. ECU 40 is connected to starter switch 21 and a speed sensor 41 arranged near the real wheel for detecting the number of revolutions of the rear wheel. Speed sensor 41 is an example of a 'rotation detecting means' of the invention. ECU 40 transmits that starter switch 21 is ON to control portion 33 when starter switch 21 is ON. ECU 40 also transmits the number of revolutions of the rear wheel detected by speed sensor 41 to control portion 33.

Indicator control circuit 36 is connected to an indicator 43 provided at a meter 42 (FIG. 12). Indicator 43 is an example of an 'alarming means' of the invention. Indicator control circuit 36 winks or turns off indicator 43 by a signal from control portion 33. Meter 42 has a distance meter 44 comprising a liquid crystal display portion that displays a running distance of the motorcycle. Control portion 33 and distance meter 44 carry out serial communication by using SCI. Distance meter 44 is an example of a 'display portion' of the invention. Vehicle control apparatus 31 comprises control unit 32, ECU 40, speed sensor 41 and meter 42.

According to the third embodiment, a counter length of drop detecting counter 34 is set to a distance D1 (about 150 m). A counter length of drop alarming counter 35 is set to a distance D2 (about 900 m). Thereby, regardless of the speed of the motorcycle, when distance D2 (about 900 m) from a spot at which the drop detecting code signal is not received first, or a spot at which the drop detecting code signal is not checked by code checking portion 38 is reached, indicator 43 is winked to notify the driver that smart key 50 may have been dropped. By displaying a distance D3 from a spot at which the drop detecting code signal is not received first, or a spot at which the drop detecting code signal is not checked by code checking portion 38, to a currently running spot at distance meter 44, the driver is informed of the distance from the spot that smart key 50 was dropped. The driver may not notice winking of indicator 43 and display of distance D2 at distance meter 44 in alarming dropping, therefore, distance meter 44 displays distance D3 adding a distance of further advancing the motorcycle from the spot of distance D2 of winking indicator 43. Distance D1 is an example of a 'second distance' of the invention, and distance D2 is an example of a 'first distance' of the invention.

According to the third embodiment, when main switch 20 and starter switch 21 are depressed, the individual identification code request signal is transmitted to smart key 50 by transmitting/receiving circuit 37 and control portion 33. When the counter length of drop detecting counter 34 becomes distance D1 (about 150 m) in a state that the communication system between control unit 32 for detecting dropping of smart key 50 and smart key 50 is made ON by control portion 33, the drop detecting code request signal is transmitted to smart key 50. Further, transmitting/receiving circuit 37 transmits the signal received from smart key 50 to control portion 33.

When the signal received from smart key 50 is transmitted from transmitting/receiving circuit 37 to control portion 33, code checking portion 38 acquires the signal from control portion 33. Code checking portion 38 is recorded with the same individual identification code and drop detecting code as recorded in smart key 50. When the individual identification code or the drop detecting code is transmitted from control portion 33 (smart key 50), code checking portion 38 determines whether the transmitted individual identification code or drop detecting code match the individual identification code or drop detecting code recorded in code checking portion 38.

The third embodiment is otherwise similar to the first and second embodiments. Drop detection processing of vehicle control apparatus 31 according to the third embodiment is now described in detail with reference to FIGS. 11-13. Drop detection flow of the third embodiment is similar to steps S1-S9 (FIG. 8) of the first embodiment, so repeat explanation is omitted.

As shown in FIG. 13, at step S41, the number of revolutions of the rear wheel, detected by speed sensor 41 is transmitted from control portion 33 to operating portion 39, and operating portion 39 calculates the running distance of the motorcycle. At step S42, control portion 33 adds the calculated distance to drop detecting counter 34 and drop alarming counter 35.

At step S43, it is determined whether a counter value of drop detecting counter 34 is 150 (distance D1=about 150 m). When the value of drop detecting counter 34 is not 150, the operation is repeated until the counter value becomes 150. When the value of drop detecting counter 34 is 150, the operation proceeds to step S44.

At step S44, the drop detecting code request signal is transmitted from transmitting/receiving circuit 37 to smart key 50. When smart key 50 is disposed within a communication range (about 1 m) of control unit 32 (transmitting/receiving circuit 37), the drop detecting code request signal is received by smart key 50, and smart key 50 transmits the drop detecting code signal to transmitting/receiving circuit 37.

At step S45, it is determined whether the drop detecting code signal is received by transmitting/receiving circuit 37 in a constant period of time. When the drop detecting code signal is received, the operation proceeds to step S46. At step S46, the received drop detecting code signal is transmitted to code checking portion 38 by way of control portion 33, and code checking portion 38 determines whether the drop detecting code in the signal received from smart key 50 matches the drop detecting code previously recorded in code checking portion 38. When the drop detecting codes match, the operation proceeds to step S47. At step S47, drop alarming counter 35 is reset and the operation proceeds to step S48. At step S48, drop detecting counter 34 is reset and the operation returns to step S41. At step S46, when the drop detecting codes do not match, the operation proceeds to step S49. At step S45, when the drop detecting code signal is not received, the operation proceeds to step S49.

At step S49, it is determined whether the counter value of drop alarming counter 35 is equal to or larger than 900 (900 m). When the value of the drop alarming counter 35 is not equal to or larger than 900, the operation proceeds to step S50, drop detecting counter 34 is reset, and the operation returns to step S41. When the value of drop alarming counter 35 is equal to or larger than 900, the operation proceeds to step S51.

At step S51, indicator 43 on meter 42 is winked by indicator control circuit 36 to inform the driver of a high possibility that smart key 50 was dropped.

At step S52, a counter value (distance) added to drop alarming counter 35 is displayed on distance meter 44 by way of control portion 33 and indicator control circuit 36.

Thereafter, as described above, at step S9 of FIG. 8, the processing is finished by turning main switch 20 OFF.

According to the third embodiment, by notifying that smart key 50 is dropped at indicator 43 when the motorcycle is moved a distance D2 (about 900 m) during which the drop detecting code signal cannot be checked, the driver is alarmed and, regardless of the speed of the motorcycle, the driver is informed that smart key 50 was possibly dropped at a vicinity of a location remote from a location of dropping smart key 50 by distance D2 (about 900 m). Thereby, regardless of the running speed of the vehicle, the driver is informed that smart key 50 was dropped at a spot of a constant distance (about 900 m) from a location of dropping smart key 50.

Further, according to the third embodiment, by displaying distance D3 from the spot at which the drop detecting code signal is not checked by code checking portion 38 first to the currently running spot when the dropping of smart key 50 is alarmed by indicator 43, the driver is informed of the distance from the spot of dropping smart key 50. 'Not checked' includes a case in which there is not reception, and a case in which although there is reception, checking is not established (the smart key is not a regular smart key, or a signal from other radio wave apparatus is received).

Further, according to the third embodiment, providing speed sensor 41 for detecting rotation of the rear wheel, the distance of moving the motorcycle is easily calculated based on a detection result of speed sensor 41.

The embodiments disclosed herein are examples and not restrictive in all the aspects. The range of the invention is defined by the claims, and includes all changes within the significance and range equivalent to the scope of claims.

For example, a motorcycle is described as an example of a vehicle having the vehicle control apparatus using the portable machine, the invention is also applicable to other vehicles such as bicycles, three-wheel vehicles, ATVs (all terrain vehicles), irregular land running vehicles and the like that have a vehicle control apparatus using a portable machine (smart key).

Further, although according to the embodiments the dropping alarm is displayed at the indicator, dropping may also be alarmed by emitting a sound.

Further, changing both the subtracting counter length of the drop detecting timer and the subtracting counter length of the drop alarming timer in accordance with the running speed of the motorcycle has been described, the invention is not limited thereto and just one of the subtracting counter length of the drop detecting timer and the subtracting counter length of the drop alarming timer may change in accordance with the running speed.

Further, although according to the third embodiment, the distance calculated based on the number of revolutions of the rear wheel measured by the speed sensor is added to the drop detecting counter and the drop alarming counter, the invention is not limited thereto and may add the number of revolutions of a wheel (front or rear) measured by the speed sensor to the drop detecting counter and the drop alarming counter.

The invention claimed is:

1. A vehicle control apparatus comprising:
   transmitting means for transmitting a code request signal to a portable machine for confirming whether the portable machine is disposed within a predetermined range at an end of a repeating predetermined transmission period in order to detect dropping of the portable machine, the transmission period being based upon calculating whether the vehicle has reached a first distance;
   receiving means for receiving a code signal transmitted from the portable machine receiving the code request signal;
   code checking means for checking a code of the code signal received by the receiving means;
   a transmission control portion for changing a period of transmitting the code request signal by the transmitting means in accordance with a situation of running the vehicle; and
   a notification control portion for making an alarming means notify a driver that the portable machine is not disposed within the predetermined range based on calculating a second distance reached in a continued state in which the code signal cannot be checked by the code checking means, the code checking means checking for the code at a plurality of intervals, each interval corresponding to a respective one of the predetermined transmission periods, and with the second distance being equal to or greater than a plurality of the first distances.

2. The vehicle control apparatus according to claim 1, further comprising alarming means for notifying the driver that the portable machine is not disposed within the predetermined range when the code checking means cannot check the code of the code signal.

3. The vehicle control apparatus according to claim 2, wherein the alarming means notifies the driver that the portable machine is not disposed within the predetermined range when the receiving means cannot receive the code signal continuously by a plurality of times.

4. The vehicle control apparatus according to claim 2, further comprising a notification control portion for changing a notification time period until the alarming means notifies the driver that the portable machine is not disposed within the predetermined range.

5. The vehicle control apparatus according to claim 1, wherein the portable machine is an electronic key.

6. A vehicle comprising the vehicle control apparatus according to claim 1.

7. A vehicle control apparatus comprising:
   transmitting means for transmitting, to a portable machine for permitting use of a vehicle, a code request signal for confirming whether the portable machine is disposed within a predetermined range of the vehicle at an end of a repeating predetermined transmission period, the transmission period being based upon calculating whether the vehicle has reached a first distance;
   receiving means for receiving a code signal transmitted from the portable machine receiving the code request signal;
   code checking means for checking a code of the code signal received by the receiving means;
   alarming means for notifying a driver that the portable machine is not disposed within the predetermined range of the vehicle when the code signal cannot be checked by the code checking means; and
   a notification control portion for making the alarming means notify the driver that the portable machine is not disposed within the predetermined range of the vehicle based on calculating a second distance reached in a continued state in which the code signal cannot be checked by the code checking means, the code checking means checking for the code at a plurality of intervals, each interval corresponding to a respective one of the predetermined transmission periods, and with the second distance being equal to or greater than a plurality of the first distances.

8. The vehicle control apparatus according to claim 7, further comprising a display portion for displaying a distance from a spot at which the code signal is not checked by the code checking means first to a current spot of running the vehicle when the distance of moving the vehicle reaches the second distance and a notification by the alarming means is carried out.

9. The vehicle control apparatus according to claim 7, further comprising rotation detecting means for detecting rotation of a predetermined rotating portion when the vehicle is moved, wherein the distance of moving the vehicle is calculated based on a detection result of the rotation detecting means.

10. The vehicle control apparatus according to claim 9, wherein the predetermined rotating portion is a wheel.

11. A vehicle comprising the vehicle control apparatus according to claim 7.

12. A vehicle control apparatus comprising:
   transmitting means for transmitting, to a portable machine, a code request signal for confirming whether the portable machine is disposed within a predetermined range at an end of a repeating predetermined transmission period in order to detect dropping of the portable machine, the transmission period being based upon calculating whether the vehicle has reached a first distance;
   receiving means for receiving a code signal transmitted from the portable machine receiving the code request signal;
   code checking means for checking a code of the code signal received by the receiving means;
   alarming means for notifying a driver that the portable machine is not disposed within the predetermined range when the code signal cannot be checked by the code checking means; and
   a notification control portion for making the alarming means notify the driver that the portable machine is not disposed within the predetermined range based on calculating a second distance reached in a continued state in which the code signal cannot be checked by the code checking means, the code checking means checking for the code at a plurality of intervals, each interval corresponding to a respective one of the predetermined transmission periods, and with the second distance being equal to or greater than a plurality of the first distances.

13. A vehicle comprising the vehicle control apparatus according to claim 12.

* * * * *